(12) United States Patent
Wurtz

(10) Patent No.: US 9,191,732 B2
(45) Date of Patent: *Nov. 17, 2015

(54) HEADSET WITH AUXILIARY INPUT(S) FOR CELL PHONE AND/OR OTHER DEVICES

(71) Applicant: LIGHTSPEED AVIATION, INC., Lake Oswego, OR (US)

(72) Inventor: Michael J. Wurtz, Lake Oswego, OR (US)

(73) Assignee: LIGHTSPEED AVIATION, INC., Lake Oswego, OR (US)

( * ) Notice: Subject to any disclaimer, the term of this patent is extended or adjusted under 35 U.S.C. 154(b) by 138 days.

This patent is subject to a terminal disclaimer.

(21) Appl. No.: 14/215,752

(22) Filed: Mar. 17, 2014

(65) Prior Publication Data

US 2014/0198924 A1    Jul. 17, 2014

Related U.S. Application Data

(63) Continuation of application No. 13/018,910, filed on Feb. 1, 2011, now abandoned, which is a continuation of application No. 11/735,704, filed on Apr. 16, 2007, now Pat. No. 7,907,721, which is a continuation of application No. 10/624,906, filed on Jul. 22, 2003, now Pat. No. 7,215,766.

(60) Provisional application No. 60/397,888, filed on Jul. 22, 2002.

(51) Int. Cl.
    *H04R 1/10*      (2006.01)
    *H04M 1/60*      (2006.01)
    *H04R 5/033*     (2006.01)

(52) U.S. Cl.
    CPC ........... *H04R 1/1083* (2013.01); *H04M 1/6058* (2013.01); *H04R 5/033* (2013.01); *H04R 2201/107* (2013.01)

(58) Field of Classification Search
None
See application file for complete search history.

(56) References Cited

U.S. PATENT DOCUMENTS

| | | | |
|---|---|---|---|
| 3,227,836 A | 1/1966 | Renwick, Sr. | |
| 4,010,340 A | 3/1977 | Palmaer | |

(Continued)

FOREIGN PATENT DOCUMENTS

AU            751882         1/2000

OTHER PUBLICATIONS

"ANR 101, A Tutorial on Active Noise Reduction", LightSPEED Aviation Inc., http://www.lightspeed.com (2000), pp. 1-2.

(Continued)

*Primary Examiner* — Kent Chang
*Assistant Examiner* — Nathan Brittingham
(74) *Attorney, Agent, or Firm* — Brooks Kushman P.C.

(57) ABSTRACT

An active-noise-reduction (ANR) headset includes at least one auxiliary connection to an output of at least one device, such as a personal communications, computing, and/or entertainment device. An exemplary headset also includes a primary connection to a two-way radio or public-address system and circuitry for automatically suppressing or muting the volume of an auxiliary input signal relative to that of a primary input signal. Other exemplary features include a headset power supply, a microphone, a microphone preamplifier, and a device-detection circuit. The device-detection circuit selectively couples the power supply to the microphone preamplifier, enabling it to provide audio signals to the microphone input of the auxiliary device.

18 Claims, 3 Drawing Sheets

(56) References Cited

U.S. PATENT DOCUMENTS

| | | | |
|---|---|---|---|
| 4,118,600 A | 10/1978 | Stahl | |
| 4,160,135 A | 7/1979 | Gorike | |
| 4,239,945 A | 12/1980 | Atoji et al. | |
| 4,313,183 A | 1/1982 | Saylors | |
| 4,455,675 A | 6/1984 | Bose et al. | |
| 4,455,677 A | 6/1984 | Fox | |
| 4,473,906 A | 9/1984 | Warnaka et al. | |
| 4,491,980 A | 1/1985 | Ichikawa | |
| 4,494,074 A | 1/1985 | Bose | |
| 4,654,871 A | 3/1987 | Chaplin et al. | |
| 4,747,145 A | 5/1988 | Wiegel | |
| 4,827,458 A | 5/1989 | D'Alayer de Costemore D'Arc | |
| 4,833,719 A | 5/1989 | Carme et al. | |
| 4,922,542 A | 5/1990 | Sapiejewski | |
| 4,941,187 A | 7/1990 | Slater | |
| 4,944,020 A | 7/1990 | Noro | |
| 4,955,729 A | 9/1990 | Marx | |
| 4,980,920 A | 12/1990 | Noro et al. | |
| 5,036,228 A | 7/1991 | Noro | |
| 5,058,155 A | 10/1991 | Larsen | |
| 5,091,954 A | 2/1992 | Sasaki et al. | |
| 5,101,504 A | 3/1992 | Lenz | |
| 5,144,678 A | 9/1992 | Lenz | |
| 5,181,252 A | 1/1993 | Sapiejewski et al. | |
| 5,182,774 A | 1/1993 | Bourk | |
| 5,329,593 A | 7/1994 | Lazzeroni et al. | |
| 5,343,523 A | 8/1994 | Bartlett et al. | |
| 5,396,551 A | 3/1995 | Lucey | |
| 5,426,689 A | 6/1995 | Griffith et al. | |
| 5,557,653 A | 9/1996 | Paterson et al. | |
| 5,590,208 A | 12/1996 | Koyano et al. | |
| 5,604,813 A * | 2/1997 | Evans | G10K 11/1788 381/71.13 |
| 5,635,948 A | 6/1997 | Tonosaki | |
| 5,647,011 A | 7/1997 | Garvis | |
| 5,675,658 A | 10/1997 | Brittain | |
| 5,708,725 A | 1/1998 | Ito | |
| 5,729,605 A | 3/1998 | Bobisuthi et al. | |
| 5,732,143 A | 3/1998 | Andrea et al. | |
| 5,748,749 A | 5/1998 | Miller et al. | |
| 5,825,897 A | 10/1998 | Andrea et al. | |
| 5,862,493 A * | 1/1999 | Barkat | H03K 17/302 307/66 |
| 5,913,163 A | 6/1999 | Johansson | |
| 5,983,100 A | 11/1999 | Johansson et al. | |
| 5,987,144 A | 11/1999 | Carme et al. | |
| 6,069,959 A | 5/2000 | Jones | |
| 6,078,675 A | 6/2000 | Bowen-Nielsen et al. | |
| 6,118,878 A | 9/2000 | Jones | |
| 6,130,953 A | 10/2000 | Wilton et al. | |
| 6,278,786 B1 | 8/2001 | McIntosh | |
| 6,683,965 B1 | 1/2004 | Sapiejewski | |
| 6,782,106 B1 | 8/2004 | Kong et al. | |
| 6,873,862 B2 | 3/2005 | Reshefsky | |
| 7,076,204 B2 | 7/2006 | Richenstein et al. | |
| 7,215,766 B2 | 5/2007 | Wurtz | |
| 7,317,802 B2 | 1/2008 | Wurtz | |
| 7,668,308 B1 | 2/2010 | Wurtz | |
| 7,907,721 B1 | 3/2011 | Wurtz | |
| 2002/0015501 A1 | 2/2002 | Sapiejewski | |
| 2002/0082008 A1 * | 6/2002 | Nelson | H04B 7/18506 455/431 |
| 2003/0026440 A1 | 2/2003 | Lazzeroni et al. | |
| 2003/0054817 A1 * | 3/2003 | Goldberg | G01S 5/0284 455/431 |
| 2005/0276421 A1 | 12/2005 | Bergeron et al. | |

OTHER PUBLICATIONS

"SafetyCell", www.pilotsupport.com (2003), 1.
"Softcomm Products", www.softcommheadsets.com (Jun. 2003), 1.
"User Instructions, ANR-1D, Active Noise Reduction Headset", Telex Communications, Inc., Minneapolis, MN (1999), pp. 1-6.
Busch, M., "AVweb Product Report: LightSPEED Technologies 25XL Active Noise Reduction Headset", file://C:\TMP\LightSPEED_25XL_ANR_Headset.htm (1997), 1-7.
"ANR 101 Section 1: The Basics of ANR", LightSPEED Aviation, Inc., http://www.lightspeed.com (2000), pp. 1-6.
U.S. Appl. No. 10/624,906, Advisory Action mailed Nov. 27, 2006, 3 pgs.
U.S. Appl. No. 10/624,906, Final Office Action mailed Jun. 2, 2006, 9 pgs.
U.S. Appl. No. 10/624,906, Interview Summary filed Dec. 4, 2006, 1 pg.
U.S. Appl. No. 10/624,906, Non-Final Office Action mailed Aug. 4, 2005, 7 pgs.
U.S. Appl. No. 10/624,906, Notice of Allowance mailed Dec. 20, 2006, 6 pgs.
U.S. Appl. No. 10/624,906, Re-exam Application filed Apr. 23, 2010, 64 pgs.
U.S. Appl. No. 10/624,906, Response filed Jan. 4, 2006 to Non-Final Office Action mailed Aug. 4, 2005, 10 pgs.
Rule 132 Declaration of Hal Greenberger with Exhibit A: Hal Greenberger Curriculum Vitae, 2 pgs. publication date—Apr. 23, 2010.
Reexam Control No. 95/001,347, Inter Partes Reexamination Communication Granting Request for Reexamination mailed Jul. 30, 2010, 15 pgs.
Reexam Control No. 95/001,347, Office Action mailed Jul. 30, 2010, 40 pgs.
USPTO Office Action on U.S. Appl. No. 11/735,704 dated Jul. 7, 2009, 9 pgs.
Response to Office Action (Contains: Amendment and Response under 37 CFR 1.111 (7 pgs); Petition for extension of time (1 pg.); Authorization to charge Deposit Account to cover the extension of time fees; Supplemental Information Disclosure Statement (2 pgs.); terminal disclaimer (3 pgs.) and fee on U.S. Appl. No. 11/735,704 electronically filed with USPTO on Jan. 7, 2010.
USPTO Notice of Allowance for U.S. Appl. No. 11/735,704 dated Feb. 17, 2010.
USPTO Notice of Allowance for U.S. Appl. No. 11/735,704 dated Jul. 13, 2010.
U.S. Pat. No. 7,215,766 File History.
Shaw, E.A.G; Thiessen, G.J., "Acoustics of Circumaural Earphones", The Journal of the Acoustical Society of America, vol. 34, No. 9, Sep. 1962, pp. 1233-1246.
User Guide—Mach 1, Mach 1.C, Mach 1.S, www.lightspeedaviation.com, Mar. 30, 2007, 16 pgs.
Anwar, Aamir, Low Frequency Finite Element Modeling of Passive Noise Attenuation in Ear Defenders, Thesis submitted to Faculty of Virginia Polytechnic Institute and State University, pp. 1-114.

* cited by examiner

HEADSET WITH AUXILIARY INPUT(S) FOR CELL PHONE AND/OR OTHER DEVICES

CROSS-REFERENCE TO RELATED APPLICATIONS

This application is a continuation of U.S. application Ser. No. 13/018,910 filed Feb. 1, 2011, which is a continuation of U.S. application Ser. No. 11/735,704 filed Apr. 16, 2007, now U.S. Pat. No. 7,907,721, which is a continuation of U.S. patent application Ser. No. 10/624,906, filed Jul. 22, 2003, now U.S. Pat. No. 7,215,766, which claims priority under 35 U.S.C. 119(e) to co-owned U.S. provisional application 60/397,888, filed Jul. 22, 2002, which applications are incorporated herein by reference.

TECHNICAL FIELD

The present invention concerns headphones or headsets and related circuits and methods.

BACKGROUND

Headsets are used in variety of applications to facilitate one- or two-way audio communications between users and/or devices. For example, many aircraft pilots wear headsets to enable them to communicate via two-way radio with other aircraft and air-traffic controllers as well as via a public-address system with passengers. Additionally, some headsets are worn to facilitate hands-free usage of mobile telephones, while others facilitate private listening to devices, such as computers, stereos, disk players, etc.

One problem that the present inventor recognized is that conventional headsets lack means for successfully integrating more than one audio source, despite their proximity to multiple sources of audio signals. Accordingly, there is a need for headsets that facilitate use of more than one signal source.

SUMMARY

To address this and/or other needs, the present inventors devised one or more devices, circuits, and methods related to simultaneous connection of at least two audio input signals to a headset. For example, in one embodiment, an active-noise-reduction (ANR) headset includes at least one auxiliary port for connection to an output of at least one device, such as a personal communications, computing, and/or entertainment device. This exemplary headset also includes a primary port for connection to a two-radio or public-address system and circuitry for automatically suppressing or muting the volume of an auxiliary input signal relative to that of a primary input signal.

Other exemplary features include a headset power supply, a microphone, a microphone preamplifier, and a device-detection circuit. The device-detection circuit detects connection of the auxiliary port to a microphone input and couples the power supply to the microphone preamplifier, enabling it to provide audio signals to the microphone input.

DETAILED DESCRIPTION

The following detailed description, which references and incorporates the attached Figures, describes and illustrates one or more specific embodiments of the invention. These embodiments, offered not to limit but only to exemplify and teach, are shown and described in sufficient detail to enable those skilled in the art to implement or practice the invention. Thus, where appropriate to avoid obscuring the invention, the description may omit certain information known to those of skill in the art.

Figure 1:
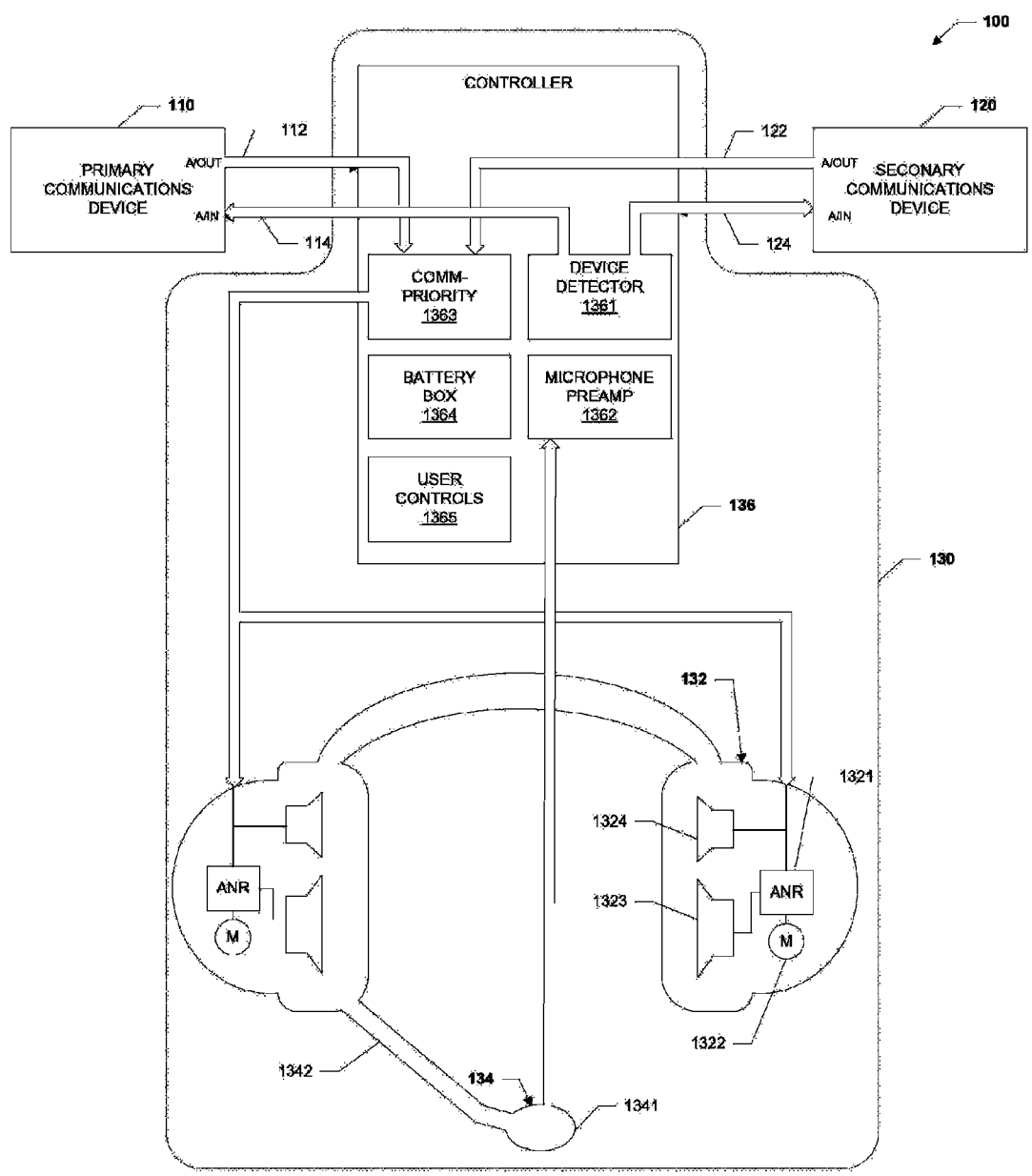
FIG. 1 is a block diagram of an exemplary system 100 corresponding to one or more embodiments of the present invention.

FIG. 1 shows an exemplary system 100 incorporating teachings of the present invention. Specifically, system 100 includes a primary audio communication device 110, a secondary audio communications device 120, and an automatic-noise-reduction (ANR) headset 130.

Primary communications device 110 includes, among other items not shown, a headphone output jack 112 and a microphone jack 114 coupled to internal circuitry not shown. In the exemplary embodiment, device 110 takes the form of a two-way aircraft radio, with headphone jack 112 being a 0.250-inch female stereo plug connector and microphone jack 114 being a 0.206-inch, female stereo plug connector. In some embodiments, device 110 includes a public-address or intercom capability.

Secondary communications device (or system) 120 includes, among other items (not shown), an audio output jack 122 and an external microphone jack 124. In the exemplary embodiment, communications device 120 takes the form of a cellular telephone, with output jack 122 and microphone jack 124 coupled to interface circuitry (not shown) which supports use of a conventional hands-free mobile-phone headset, which includes a microphone and an ear-piece (or headphones). (Hands-free headsets typically include an unbuffered electret microphone that is powered by interface circuitry (not shown) in the cell phone or other type secondary device. In the exemplary embodiment, this interface circuitry is not suitable for boom microphones in aviation headsets.) In some other embodiments, device 120 takes the form of a two-way radio, laptop computer, or other audio source or audio output device, such as a music or video player or other personal listening device. In still other embodiments, device 120 includes or is coupled to an input/output port of a larger multiport distribution network that distributes audio signals, for example, throughout an airliner.

ANR headset 130 includes, among other things, an earpiece 132, a boom microphone 134, and a controller 136. Earpieces 132, which each take the exemplary form of a circumaural earcup in this embodiment, fit over a respective ear of a user (not shown). However, in other embodiments, the earpiece takes the form of superaural, in-the-ear, or behind-the-ear devices. Specifically, earpiece 132 includes ANR control circuitry 1321, an ANR microphone 1322, an ANR speaker 1323, and a non-ANR speaker 1324.

Boom microphone 134 includes a boom 1341 which extends from one of earpieces 132, and a microphone 1342 positioned at an end of the boom. Other embodiments use other forms of microphones. Earpiece 132 and boom microphone 134 are both coupled to controller 136.

Controller 136 includes secondary-device detector 1361, a boom microphone preamplifier 1362, a comm-priority module 1363, a battery box 1364, and user controls 1365. In the exemplary embodiment, the controller is provided as a box or module separate from the earpieces; however, in some embodiments, all or one or portions of the controller are incorporated into one or more of the earpieces. For example, some embodiments place one or more of the controller input jacks directly on one of the earpieces.

Secondary-device detector 1361 is coupled to microphone jack 124 of secondary communications device 120, microphone preamplifier 1362, and battery box 1364. Microphone preamplifier 1362, in the exemplary embodiment, is designed to operate using a 5-10 VDC voltage source and a 600-2000 ohm resistor. Comm-priority module 1363 is coupled to headphone jack 122 of primary communications device 110 and to audio output jack 122 of the secondary communication device. Manual controls 1365 include on-off switch, left-right volume controls, stereo-mono switch, mode-programming switches, and bass and treble controls (all not shown separately).

In general operation, secondary device detector 1361, which includes an audio input jack coupled to microphone jack 124 of secondary communications device 120, senses or detects connection or activation of device 120 to headset 130 and in response couples power derived from battery box 1364 to boom microphone preamplifier 1362. Comm-priority module 1363, which is coupled to the headphone jack of the primary communications device and to an audio output jack of the secondary communication device, provides an automatic muting or attenuation function that reduces the volume or amplitude of an audio or electrical signal derived from the secondary communication device relative to the volume or amplitude of an audio or electrical signal derived from the primary communications device. Detector 1361 also senses decoupling or deactivation of device 120 and in turn decouples battery box 1264 from boom microphone preamplifier 1362.

Figure 2:
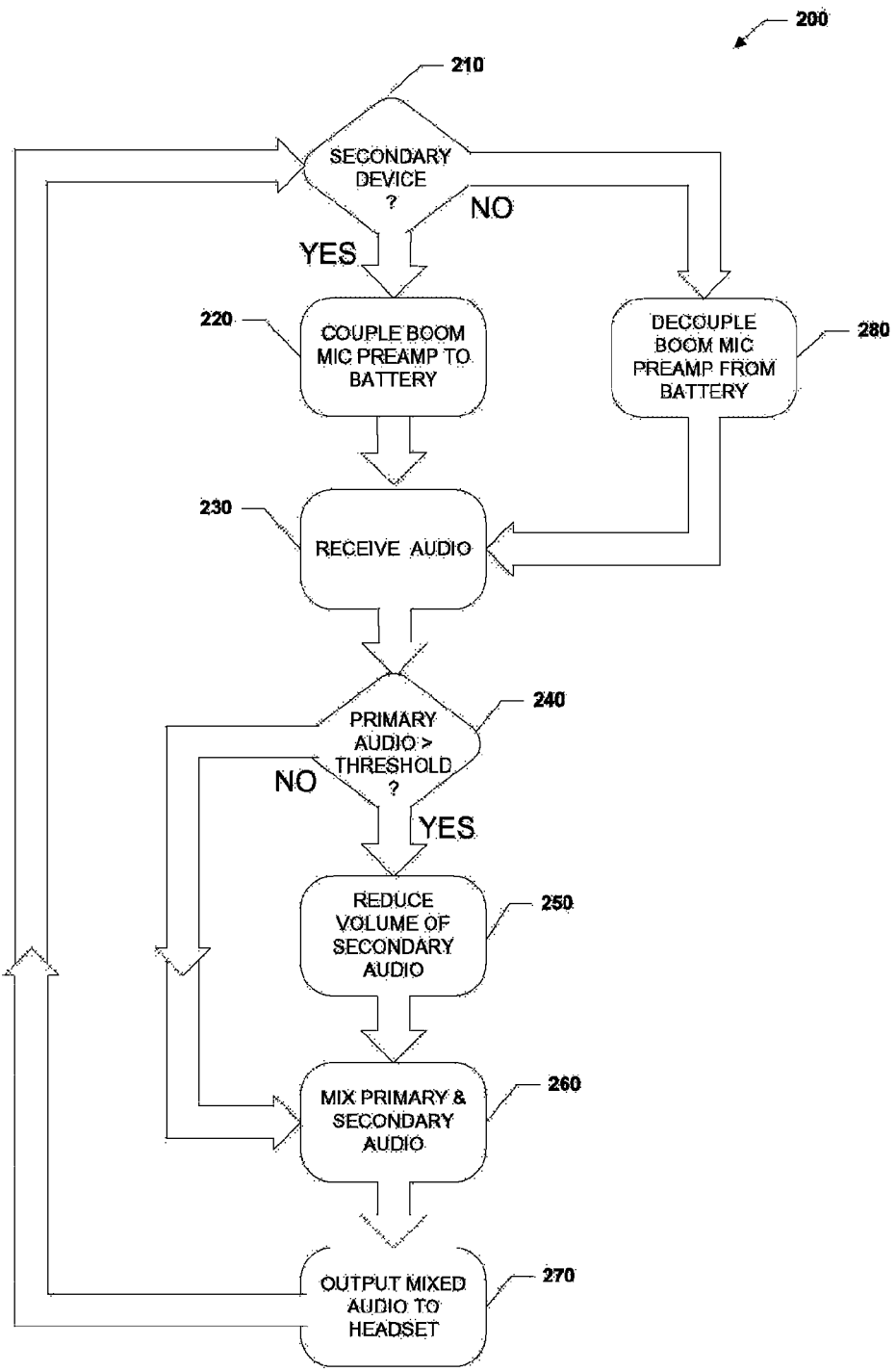
FIG. 2 is a flow chart of an exemplary method of operating one or more portions of system 100, which corresponds to one or more embodiments of the present invention.

More particularly, FIG. 2 shows a flow chart 200 of one or more exemplary methods of operating system 100, particularly in relation to control module 136. Flow chart 200 includes process blocks 210-280, which are arranged and described serially for clarity. However, two or more of the blocks, in whole or in part, can be executed in parallel. Additionally, some embodiments may alter the process sequence by omitting or adding one or more blocks or provide different functional partitions to achieve analogous results. Moreover, still other embodiments implement one or more of the blocks using a processor or programmable logic device and an electronic, magnetic, or optical storage medium bearing machine-executable instructions for execution or facilitating execution of one or more portions of the exemplary method. Thus, the exemplary process flow applies to software, hardware, firmware, and other implementations beyond those exemplified here.

At block 210, exemplary execution begins with determining whether a secondary device, such as secondary communications device 120, is coupled to headset 130, or more precisely control module 136. In the exemplary embodiment, this entails using detector 1361 to detect or sense a preamplifier bias signal from secondary communications device 120. In some embodiments, the preamplifier bias signal is a 2.5 VDC signal, which is generally incompatible with the bias signal used in most aviation-grade ANR headsets. Other embodiments may use the state of a switch to determine connection of a secondary device. If the determination is that a secondary device is coupled to the headset, execution advances to block 220.

In block 220, detector 1361 couples power derived from battery box 1364 to microphone preamplifier 1362, thereby enabling the headset to self-power its boom microphone rather than relying on power from the primary communications device. This self-powering feature allows one to use the headset with the secondary communications device independent of any connection to the primary communications device. One benefit of this feature is that it allows the secondary device to be used in a noisy environment with no other electronics or power beyond the headset itself. Execution of the exemplary method continues at block 230.

Block 230 entails headset 130 receiving audio signals from one or the other or both of the primary and the secondary communications devices 110 and 120. In the exemplary embodiment, these audio signals are received at comm-priority module 1363 via headphone jack 112 and/or audio output 122. Execution then proceeds to block 240.

Block 240 entails determining whether to alter the relative amplitude of the primary and secondary audio signals. In the exemplary embodiment, this entails comparing the primary audio signal (more precisely the voltage at headphone jack 112) to a threshold voltage. If the comparison indicates that the primary audio signal is greater than the threshold voltage, execution advances to block 250; otherwise execution branches to block 260.

Block 250 entails altering the relative amplitude of the primary and secondary audio signals. In the exemplary embodiment, this alteration entails reducing the amplitude (or volume) of the secondary audio signal relative to that of the primary audio signal. Some embodiments may increase the amplitude or volume of the primary audio signal to be greater than that of secondary audio signal. Some embodiments may additionally output a notification signal, such as high-pitched tone or beep, to indicate presence of a primary audio signal in excess of the threshold.

Block 260 entails mixing the primary and secondary audio signals. In the exemplary embodiment, this mixing entails mixing the primary audio signal, or more precisely any voltage present on headphone jack 112 with the reduced or unreduced secondary audio signal.

Block 270 entails outputting the mixed primary and secondary audio signals to one or both of earpieces 132. In the exemplary embodiment, the mixed signals are output to speaker 1324 and to ANR circuitry 1321. Some embodiments, however, may omit or bypass the ANR circuitry. Execution then returns back to block 210.

Block 210 determines whether there is still a secondary device coupled to the headset. If the determination is that a device is still coupled to the headset, execution continues to block 220, as previously described. However, if the determination is that there is no secondary device (or that the secondary device has been deactivated, for example, as evidenced by failure to receive a microphone bias voltage from the device), then execution advances to block 280, which entails decoupling of the headset battery from the boom microphone preamplifier to conserve battery power.

Figure 3:
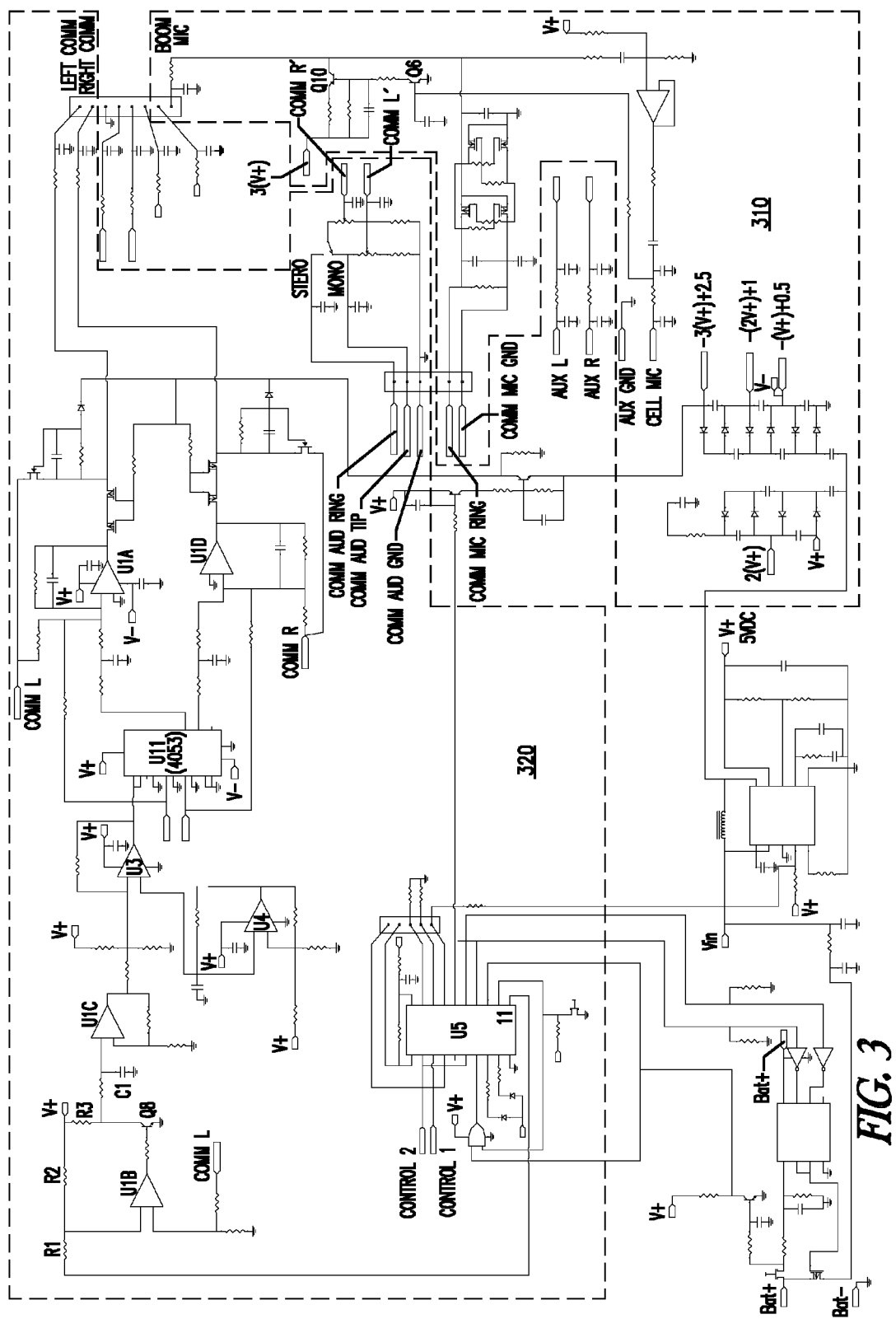
FIG. 3 is an electrical schematic of one or more exemplary circuits in system 100, each corresponding to one or more embodiments of the present invention.

FIG. 3 shows circuitry 300, which includes a detector circuit 310 that represents an exemplary implementation of secondary-device detector 1361 and a comm-priority circuit 320 that represents an exemplary implementation of comm-priority module 1363. In the figure, incoming signals from the secondary device are received at secondary inputs Aux_R and Aux_L, and incoming signals from the primary device are received at COM_AUD TIP and COM_AUD GND. Battery terminals (shown in the lower left-hand corner) are labeled Bat+ and Bat−.

Detector circuit 310 detects the presence of an external bias signal at an audio input jack (denoted cell mic in the figure) via a transistor Q6, which turns on the current source comprising a transistor Q10. Activation of the current source provides a bias current for the boom microphone preamplifier. The current source has a compliance of over 10 VDC for undistorted communications at high-sound pressures. Notably, this implementation does not interfere with normal operation of the boom microphone preamplifier, if it is connected to a radio or intercom bias circuit because it is a current source realizing a high Thevinin equivalent impedance. Although not preferred, some embodiments may use a source with a low Thevinin equivalent impedance.

Comm-priority circuit 320 treats the Com_L input as the primary input to the headset and compares this signal to a threshold voltage via comparator circuitry that includes operational amplifier U1B. If the signal at the Com_L input exceeds the trigger threshold (set by resistors R1 and R2, voltage V+, and processor output pin 11), then the output of operational amplifier U1B output goes high, saturating transistor Q8 and causing this transistor to rapidly discharge capacitor C1. In response to this discharge, operational amplifier U1C produces a low voltage at its output, which is coupled to a pulse-width-modulation (PWM) circuit comprising oscillator U4 and PWM comparator U3.

In turn, the PWM circuit reduces the duty cycle of its output signal. This output signals controls analog switch U11 (4053), which is part of a chopping circuit, causing it to attenuate the auxiliary inputs Aux_L and Aux_R. U1A and U1D denote summing amplifiers that sum or mix the primary and secondary inputs, and also provide a reconstruction filter for the chopped signal. The outputs of summing amplifiers U1A and U1D are then passed up to the earpieces for transduction into acoustic signals.

When the primary audio input stops exceeding the trigger threshold, capacitor C1 slowly starts to charge up via resistor R3, thus increasing the duty cycle of the signal output from the PWM circuit and the gain level of the secondary audio input. The exemplary embodiment increases this gain linearly until it reaches its original level. (Non-linear restoration of the secondary signal is also feasible.) Microprocessor U5 is programmable via control inputs CONTROL1 and CONTROL2 to disable communications priority by setting processor output pin 11 to a high logic state and thereby moving the trigger threshold for initiating attenuation of the secondary input to a high value.

Other implementations could assign priority to the secondary inputs or allow the user to select which inputs have priority. The comm-priority functionality is selectable and controlled through microprocessor U5 using a combination of pushes of a button on a separate control module, such as module 136. Other embodiments place this control with controls on one or more of the earcups, the bridge between the earcups, or other convenient location.

CONCLUSION

The embodiments described above are intended only to illustrate and teach one or more ways of practicing or implementing the present invention, not to restrict its breadth or scope. The actual scope of the invention, which encompasses all ways of practicing or implementing the concepts of the invention, is defined by the following claims and their equivalents.

What is claimed is:

1. An automatic noise reduction (ANR) headset or headset assembly for use with an aircraft two-way radio and a mobile telephone, comprising:
a pair of circumaural earcups connected by a headpiece;
a speaker associated with at least one earcup;
an ANR microphone associated with at least one earcup;
a boom microphone extending from one of the earcups and coupled to a preamplifier;
a battery connector for connecting a first power source having a first voltage level;
a two-way aircraft radio input for connecting a second power source having a second voltage level different from the first voltage level; and
control circuitry coupled to the speaker, the ANR microphone, the preamplifier, the battery connector, and the two-way aircraft radio input, wherein the control circuitry generates signals for the speaker to provide automatic noise reduction based on signals from the ANR microphone and selectively couples the preamplifier to receive power from the first power source or the second power source to enable use of the boom microphone with the mobile telephone.

2. The headset or headset assembly of claim 1 wherein the control circuitry mixes signals from the mobile telephone and the aircraft radio input.

3. The headset or headset assembly of claim 2 wherein the control circuitry modifies gain of the mobile telephone signal.

4. The headset or headset assembly of claim 2 wherein the control circuitry increases gain of the aircraft radio signal.

5. The headset or headset assembly of claim 2 wherein the control circuitry selectively mutes the mobile telephone signal.

6. An automatic noise reduction (ANR) headset or headset assembly for use with an aircraft two-way radio and a mobile telephone, comprising:
a pair of circumaural earcups connected by a headpiece;
a speaker associated with at least one earcup;
a noise reduction microphone associated with at least one earcup;
a second microphone coupled to a preamplifier having an associated operating voltage;
at least one battery;
a two-way aircraft radio input; and
a first circuit coupled to the speaker and the noise reduction microphone that generates signals for the speaker based on signals received from the noise reduction microphone; and
a second circuit coupled to the preamplifier to selectively provide the associated operating voltage to the preamplifier using the battery when the headset is coupled to the mobile telephone to enable use of the second microphone with the mobile telephone.

7. The headset or headset assembly of claim 6 further comprising:
a communications priority module that attenuates one of the signals from the mobile telephone and the aircraft radio input based on a predetermined priority.

8. An automatic noise reduction (ANR) headset or headset assembly, comprising:
an earpiece having a speaker;
a noise reduction microphone;
a second microphone extending from the earpiece;
a battery box; and
a controller coupled to the speaker, noise reduction microphone, second microphone, and battery box, the controller including:
an automatic noise reduction circuit generating signals for the speaker based on signals from the noise reduction microphone;
a microphone preamplifier associated with the second microphone;

a device detector that detects connection of a device and selectively couples power derived from the battery box to the preamplifier; and a communications priority module that provides an automatic attenuation function to reduce the amplitude of an audio signal from a secondary device relative to amplitude of an audio signal from a primary communication device.

9. The headset or headset assembly of claim 1 wherein the control circuitry comprises a communications priority module that attenuates at least one of the signals from the mobile telephone and the two-way aircraft radio input.

10. The headset or headset assembly of claim 1 wherein the control circuitry comprises:

a first circuit coupled to the speaker and the ANR microphone that generates signals for the speaker based on signals received from the ANR microphone; and a second circuit coupled to the preamplifier that selectively provides an associated operating voltage to the preamplifier from a battery associated with the battery connector when the headset is coupled to the mobile telephone to enable use of the boom microphone with the mobile telephone.

11. The headset or headset assembly of claim 10 wherein the boom microphone provides an audio input signal to the mobile telephone.

12. The headset or headset assembly of claim 1 wherein the control circuitry comprises:

a device detector that detects connection of the mobile telephone and selectively couples power from the second power source to the preamplifier in response.

13. The headset or headset assembly of claim 12 wherein the control circuitry comprises:

a communications priority module that reduces amplitude of an audio signal from an auxiliary device coupled to the headset or headset assembly relative to amplitude of an audio signal from the aircraft two-way radio.

14. The headset or headset assembly of claim 1 wherein the control circuitry decouples the preamplifier from the battery connector when the mobile telephone is decoupled or deactivated.

15. The headset or headset assembly of claim 1 wherein the control circuitry couples the preamplifier to receive power from the battery connector in response to a signal from the mobile telephone and decouples the preamplifier when the signal from the mobile telephone is not detected.

16. The headset or headset assembly of claim 1 wherein the control circuitry selectively couples and decouples the preamplifier to receive power from the aircraft two-way radio input or the battery connector based on signals from the two-way aircraft radio input and the mobile telephone.

17. The headset or headset assembly of claim 1 wherein the mobile telephone is connected via an associated auxiliary input jack of the headset or headset assembly.

18. The headset or headset assembly of claim 1 wherein the control circuitry selectively couples the preamplifier to receive power from the battery connector when power from the two-way aircraft radio input is unavailable.

* * * * *